(12) United States Patent
King et al.

(10) Patent No.: US 10,351,159 B2
(45) Date of Patent: Jul. 16, 2019

(54) RETRACTABLE STEERING COLUMN WITH A RADIALLY PROJECTING ATTACHMENT

(71) Applicant: Steering Solutions IP Holding Corporation, Saginaw, MI (US)

(72) Inventors: Todd M. King, Saginaw, MI (US); Joen C. Bodtker, Gaines, MI (US); Melvin Lee Tinnin, Clio, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 286 days.

(21) Appl. No.: 15/142,115

(22) Filed: Apr. 29, 2016

(65) Prior Publication Data

US 2016/0318540 A1 Nov. 3, 2016

Related U.S. Application Data

(60) Provisional application No. 62/155,560, filed on May 1, 2015.

(51) Int. Cl.
| | |
|---|---|
| *B62D 1/18* | (2006.01) |
| *B62D 1/183* | (2006.01) |
| *B60R 7/04* | (2006.01) |
| *B60Q 1/14* | (2006.01) |
| *B60Q 1/42* | (2006.01) |

(52) U.S. Cl.
CPC ........... *B62D 1/183* (2013.01); *B60Q 1/1469* (2013.01); *B60Q 1/42* (2013.01); *B60R 7/04* (2013.01)

(58) Field of Classification Search
CPC ................................ B62D 1/187; B62D 1/183

USPC ........................... 280/775, 777; 74/492, 493
See application file for complete search history.

(56) References Cited

U.S. PATENT DOCUMENTS

| | | | |
|---|---|---|---|
| 3,782,492 | A | 1/1974 | Hollins |
| 4,315,117 | A | 2/1982 | Kokubo et al. |
| 4,337,967 | A | 7/1982 | Yoshida et al. |
| 4,503,300 | A | 3/1985 | Lane, Jr. |
| 4,503,504 | A | 3/1985 | Suzumura et al. |
| 4,561,323 | A | 12/1985 | Stromberg |
| 4,602,520 | A | 7/1986 | Nishikawa et al. |
| 4,661,752 | A | 4/1987 | Nishikawa et al. |
| 4,669,325 | A | 6/1987 | Nishikawa |
| 4,691,587 | A | 9/1987 | Farrand et al. |

(Continued)

FOREIGN PATENT DOCUMENTS

| | | |
|---|---|---|
| CN | 1722030 | 1/2006 |
| CN | 1736786 | 2/2006 |

(Continued)

OTHER PUBLICATIONS

China Patent Application No. 201510204221.5 Second Office Action dated Mar. 10, 2017, 8 pages.

(Continued)

*Primary Examiner* — Toan C To

(57) ABSTRACT

A driver interface for a vehicle includes a steering column assembly and a structural facial. The steering column assembly includes a column constructed and arranged to move between a retracted state and an extended state, and an attachment projecting outward from the column. The structural facial defines an alcove for receipt of the attachment when the steering column is in the retracted state.

15 Claims, 5 Drawing Sheets

(56) References Cited

U.S. PATENT DOCUMENTS

| | | | |
|---|---|---|---|
| 4,785,684 A | 11/1988 | Nichikawa et al. | |
| 4,836,566 A | 6/1989 | Birsching | |
| 4,893,518 A | 1/1990 | Matsumoto et al. | |
| 4,901,593 A | 2/1990 | Ishikawa | |
| 4,921,066 A | 5/1990 | Conley | |
| 4,962,570 A | 10/1990 | Hosaka et al. | |
| 4,967,618 A | 11/1990 | Matsumoto et al. | |
| 4,976,239 A | 12/1990 | Hosaka | |
| 5,240,284 A | 8/1993 | Takada et al. | |
| 5,295,712 A | 3/1994 | Omura | |
| 5,319,803 A | 6/1994 | Allen | |
| 5,488,555 A | 1/1996 | Asgari et al. | |
| 5,613,404 A * | 3/1997 | Lykken | B62D 1/184 280/775 |
| 5,618,058 A | 4/1997 | Byon | |
| 5,668,721 A | 9/1997 | Chandy | |
| 5,690,362 A | 11/1997 | Peitsmeier et al. | |
| 5,765,116 A | 6/1998 | Wilson-Jones et al. | |
| 5,890,397 A * | 4/1999 | Stoner | B60N 2/4606 280/775 |
| 5,893,580 A | 4/1999 | Hoagland et al. | |
| 5,911,789 A * | 6/1999 | Keipert | B62D 1/181 280/775 |
| 6,070,686 A | 6/2000 | Pollmann | |
| 6,142,523 A | 11/2000 | Bathis | |
| 6,170,862 B1 | 1/2001 | Hoagland et al. | |
| 6,227,571 B1 | 5/2001 | Sheng et al. | |
| 6,264,239 B1 | 7/2001 | Link | |
| 6,301,534 B1 | 10/2001 | McDermott, Jr. et al. | |
| 6,354,622 B1 | 3/2002 | Ulbrich et al. | |
| 6,360,149 B1 | 3/2002 | Kwon et al. | |
| 6,373,472 B1 | 4/2002 | Palalau et al. | |
| 6,381,526 B1 | 4/2002 | Higashi et al. | |
| 6,390,505 B1 | 5/2002 | Wilson | |
| 6,578,449 B1 | 6/2003 | Anspaugh et al. | |
| 6,612,198 B2 | 9/2003 | Rouleau et al. | |
| 6,612,393 B2 | 9/2003 | Bohner et al. | |
| 6,819,990 B2 | 11/2004 | Ichinose | |
| 7,021,416 B2 | 4/2006 | Kapaan et al. | |
| 7,025,380 B2 | 4/2006 | Arihara | |
| 7,048,305 B2 | 5/2006 | Muller | |
| 7,062,365 B1 | 6/2006 | Fei | |
| 7,159,904 B2 | 1/2007 | Schafer et al. | |
| 7,258,365 B2 | 8/2007 | Kahlenberg et al. | |
| 7,295,904 B2 | 11/2007 | Kanevsky et al. | |
| 7,308,964 B2 | 12/2007 | Hara et al. | |
| 7,410,190 B2 | 8/2008 | Sawada et al. | |
| 7,428,944 B2 | 9/2008 | Gerum | |
| 7,461,863 B2 | 12/2008 | Muller | |
| 7,495,584 B1 | 2/2009 | Sorensen | |
| 7,628,244 B2 | 12/2009 | Chino et al. | |
| 7,719,431 B2 | 5/2010 | Bolourchi | |
| 7,735,405 B2 | 6/2010 | Parks | |
| 7,758,073 B1 * | 7/2010 | Chou | B62D 1/10 280/775 |
| 7,793,980 B2 | 9/2010 | Fong | |
| 7,862,079 B2 | 1/2011 | Fukawatase et al. | |
| 7,894,951 B2 | 2/2011 | Norris et al. | |
| 7,909,361 B2 | 3/2011 | Oblizajek et al. | |
| 8,002,075 B2 | 8/2011 | Markfort | |
| 8,011,265 B2 | 9/2011 | Menjak et al. | |
| 8,027,767 B2 | 9/2011 | Klein et al. | |
| 8,055,409 B2 | 11/2011 | Tsuchiya | |
| 8,069,745 B2 | 12/2011 | Strieter et al. | |
| 8,079,312 B2 | 12/2011 | Long | |
| 8,146,945 B2 | 4/2012 | Born et al. | |
| 8,161,839 B2 | 4/2012 | Warashina | |
| 8,170,725 B2 | 5/2012 | Chin et al. | |
| 8,260,482 B1 | 9/2012 | Szybalski et al. | |
| 8,352,110 B1 | 1/2013 | Szybalski et al. | |
| 8,479,605 B2 | 7/2013 | Shavrnoch et al. | |
| 8,548,667 B2 | 10/2013 | Kaufmann | |
| 8,606,455 B2 | 12/2013 | Boehringer et al. | |
| 8,634,980 B1 | 1/2014 | Urmson et al. | |
| 8,650,982 B2 | 2/2014 | Matsuno et al. | |
| 8,670,891 B1 | 3/2014 | Szybalski et al. | |
| 8,695,750 B1 | 4/2014 | Hammond et al. | |
| 8,818,608 B2 | 8/2014 | Cullinane et al. | |
| 8,825,258 B2 | 9/2014 | Cullinane et al. | |
| 8,825,261 B1 | 9/2014 | Szybalski et al. | |
| 8,843,268 B2 | 9/2014 | Lathrop et al. | |
| 8,874,301 B1 | 10/2014 | Rao et al. | |
| 8,880,287 B2 | 11/2014 | Lee et al. | |
| 8,881,861 B2 | 11/2014 | Tojo | |
| 8,899,623 B2 | 12/2014 | Stadler et al. | |
| 8,909,428 B1 | 12/2014 | Lombrozo | |
| 8,948,993 B2 | 2/2015 | Schulman et al. | |
| 8,950,543 B2 | 2/2015 | Heo et al. | |
| 8,994,521 B2 | 3/2015 | Gazit | |
| 9,002,563 B2 | 4/2015 | Green et al. | |
| 9,031,729 B2 | 5/2015 | Lathrop et al. | |
| 9,032,835 B2 | 5/2015 | Davies et al. | |
| 9,039,041 B2 * | 5/2015 | Buzzard | B62D 1/16 280/771 |
| 9,045,078 B2 | 6/2015 | Tovar et al. | |
| 9,073,574 B2 | 7/2015 | Cuddihy et al. | |
| 9,092,093 B2 | 7/2015 | Jubner et al. | |
| 9,108,584 B2 | 8/2015 | Rao et al. | |
| 9,134,729 B1 | 9/2015 | Szybalski et al. | |
| 9,150,200 B2 | 10/2015 | Urhahne | |
| 9,150,224 B2 | 10/2015 | Yopp | |
| 9,164,619 B2 | 10/2015 | Goodlein | |
| 9,174,642 B2 | 11/2015 | Wimmer et al. | |
| 9,186,994 B2 | 11/2015 | Okuyama et al. | |
| 9,193,375 B2 | 11/2015 | Schramm et al. | |
| 9,199,553 B2 | 12/2015 | Cuddihy et al. | |
| 9,227,531 B2 | 1/2016 | Cuddihy et al. | |
| 9,233,638 B2 | 1/2016 | Lisseman et al. | |
| 9,235,111 B2 | 1/2016 | Davidsson et al. | |
| 9,235,987 B2 | 1/2016 | Green et al. | |
| 9,238,409 B2 | 1/2016 | Lathrop et al. | |
| 9,248,743 B2 | 2/2016 | Enthaler et al. | |
| 9,260,130 B2 | 2/2016 | Mizuno | |
| 9,290,174 B1 | 3/2016 | Zagorski | |
| 9,290,201 B1 | 3/2016 | Lombrozo | |
| 9,298,184 B2 | 3/2016 | Bartels et al. | |
| 9,308,857 B2 | 4/2016 | Lisseman et al. | |
| 9,308,891 B2 | 4/2016 | Cudak et al. | |
| 9,333,983 B2 | 5/2016 | Lathrop et al. | |
| 9,360,865 B2 | 6/2016 | Yopp | |
| 9,616,914 B2 | 4/2017 | Stinebring et al. | |
| 9,643,641 B1 | 5/2017 | Stinebring et al. | |
| 9,663,136 B2 | 5/2017 | Stinebring et al. | |
| 9,744,983 B2 | 8/2017 | Stinebring et al. | |
| 9,849,904 B2 | 12/2017 | Rouleau | |
| 9,852,752 B1 | 12/2017 | Chou et al. | |
| 9,919,724 B2 | 3/2018 | Lubischer et al. | |
| 2002/0171235 A1 * | 11/2002 | Riefe | B62D 1/184 280/775 |
| 2003/0046012 A1 | 3/2003 | Yamaguchi | |
| 2003/0094330 A1 | 5/2003 | Boloorchi et al. | |
| 2003/0146037 A1 | 8/2003 | Menjak et al. | |
| 2003/0188598 A1 | 10/2003 | Cartwright | |
| 2003/0227159 A1 | 12/2003 | Muller | |
| 2004/0016588 A1 | 1/2004 | Vitale et al. | |
| 2004/0046346 A1 | 3/2004 | Eki et al. | |
| 2004/0046379 A1 | 3/2004 | Riefe | |
| 2004/0099083 A1 | 5/2004 | Choi et al. | |
| 2004/0099468 A1 | 5/2004 | Chernoff et al. | |
| 2004/0129098 A1 | 7/2004 | Gayer et al. | |
| 2004/0204808 A1 | 10/2004 | Satoh et al. | |
| 2004/0262063 A1 | 12/2004 | Kaufmann et al. | |
| 2005/0001445 A1 | 1/2005 | Ercolano | |
| 2005/0081675 A1 | 4/2005 | Oshita et al. | |
| 2005/0197746 A1 | 9/2005 | Pelchen et al. | |
| 2005/0242562 A1 | 11/2005 | Ridgway et al. | |
| 2005/0263996 A1 | 12/2005 | Manwaring et al. | |
| 2005/0275205 A1 | 12/2005 | Ahnafield | |
| 2006/0186658 A1 | 8/2006 | Yasuhara et al. | |
| 2006/0224287 A1 | 10/2006 | Izawa et al. | |
| 2006/0244251 A1 | 11/2006 | Muller | |
| 2007/0021889 A1 | 1/2007 | Tsuchiya | |
| 2007/0029771 A1 | 2/2007 | Haglund et al. | |
| 2007/0046003 A1 | 3/2007 | Mori et al. | |

(56) References Cited

U.S. PATENT DOCUMENTS

| | | |
|---|---|---|
| 2007/0046013 A1 | 3/2007 | Bito |
| 2007/0241548 A1* | 10/2007 | Fong .................. B60R 21/09 280/777 |
| 2007/0284867 A1 | 12/2007 | Cymbal et al. |
| 2008/0009986 A1 | 1/2008 | Lu et al. |
| 2008/0047382 A1 | 2/2008 | Tomaru et al. |
| 2008/0079253 A1 | 4/2008 | Sekii et al. |
| 2008/0238068 A1 | 10/2008 | Kumar et al. |
| 2009/0024278 A1 | 1/2009 | Kondo et al. |
| 2009/0056493 A1* | 3/2009 | Dubay .................. B23P 15/00 74/492 |
| 2009/0256342 A1 | 10/2009 | Cymbal et al. |
| 2009/0266195 A1* | 10/2009 | Tanke .................. B62D 1/184 74/493 |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0218637 A1 | 9/2010 | Barroso |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0087006 A1 | 4/2013 | Ohtsubo et al. |
| 2013/0104689 A1* | 5/2013 | Marutani .............. B62D 1/187 74/493 |
| 2013/0133463 A1 | 5/2013 | Moriyama |
| 2013/0158771 A1 | 6/2013 | Kaufmann |
| 2013/0199866 A1 | 8/2013 | Yamamoto et al. |
| 2013/0205933 A1 | 8/2013 | Moriyama |
| 2013/0218396 A1 | 8/2013 | Moshchuk et al. |
| 2013/0233117 A1 | 9/2013 | Read et al. |
| 2013/0325202 A1 | 12/2013 | Howard et al. |
| 2014/0028008 A1 | 1/2014 | Stadler et al. |
| 2014/0046542 A1 | 2/2014 | Kauffman et al. |
| 2014/0046547 A1 | 2/2014 | Kaufmann et al. |
| 2014/0111324 A1 | 4/2014 | Lisseman et al. |
| 2014/0137694 A1* | 5/2014 | Sugiura ................ B62D 1/192 74/493 |
| 2014/0277896 A1 | 9/2014 | Lathrop et al. |
| 2014/0300479 A1 | 10/2014 | Wolter et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer |
| 2015/0051780 A1 | 2/2015 | Hahne |
| 2015/0060185 A1 | 3/2015 | Feguri |
| 2015/0120142 A1 | 4/2015 | Park et al. |
| 2015/0137492 A1 | 5/2015 | Rao et al. |
| 2015/0203145 A1 | 7/2015 | Sugiura et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0324111 A1 | 11/2015 | Jubner et al. |
| 2016/0009332 A1 | 1/2016 | Sirbu |
| 2016/0075371 A1 | 3/2016 | Varunkikar et al. |
| 2016/0082867 A1 | 3/2016 | Sugioka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |
| 2016/0244070 A1 | 8/2016 | Bendewald et al. |
| 2016/0244086 A1 | 8/2016 | Moriyama |
| 2016/0318540 A1 | 11/2016 | King |
| 2016/0318542 A1 | 11/2016 | Pattok et al. |
| 2016/0347347 A1 | 12/2016 | Lubischer |
| 2016/0347348 A1 | 12/2016 | Lubischer |
| 2016/0362084 A1 | 12/2016 | Martin et al. |
| 2016/0362117 A1 | 12/2016 | Kaufmann et al. |
| 2016/0362126 A1* | 12/2016 | Lubischer .............. B62D 1/183 |
| 2016/0368522 A1 | 12/2016 | Lubischer |
| 2016/0375770 A1 | 12/2016 | Ryne et al. |
| 2016/0375860 A1 | 12/2016 | Lubischer |
| 2016/0375923 A1 | 12/2016 | Schulz |
| 2016/0375924 A1 | 12/2016 | Bodtker et al. |
| 2016/0375925 A1 | 12/2016 | Lubischer et al. |
| 2016/0375926 A1 | 12/2016 | Lubischer et al. |
| 2016/0375927 A1 | 12/2016 | Schulz |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0113589 A1 | 4/2017 | Riefe |
| 2017/0113712 A1 | 4/2017 | Watz |
| 2017/0294120 A1 | 10/2017 | Ootsuji |
| 2017/0297606 A1 | 10/2017 | Kim et al. |
| 2018/0154932 A1 | 6/2018 | Rakouth et al. |
| 2018/0251147 A1 | 9/2018 | Heitz et al. |
| 2018/0273081 A1 | 9/2018 | Lubischer et al. |

FOREIGN PATENT DOCUMENTS

| | | |
|---|---|---|
| CN | 101037117 | 9/2007 |
| CN | 101041355 | 9/2007 |
| CN | 101596903 | 12/2009 |
| CN | 102452391 | 5/2012 |
| CN | 103085854 A | 5/2013 |
| CN | 103419840 | 12/2013 |
| CN | 203793405 U | 8/2014 |
| CN | 204222957 U | 3/2015 |
| DE | 4310431 A1 | 10/1994 |
| DE | 19523214 A1 | 1/1997 |
| DE | 19923012 | 11/2000 |
| DE | 10212782 A1 | 10/2003 |
| DE | 102005032528 | 1/2007 |
| DE | 102005056438 A1 | 6/2007 |
| DE | 102006025254 | 12/2007 |
| DE | 1020081057313 A1 | 10/2009 |
| DE | 102010025197 A1 | 12/2011 |
| EP | 1559630 A2 | 8/2005 |
| EP | 1783719 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 | 5/2005 |
| FR | 3016327 A1 | 7/2015 |
| JP | H05162652 | 6/1993 |
| KR | 20100036433 A | 6/2010 |
| WO | 2006099483 A1 | 9/2006 |
| WO | 2010082394 A1 | 7/2010 |
| WO | 2010116518 | 10/2010 |

OTHER PUBLICATIONS

CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.

(56) References Cited

OTHER PUBLICATIONS

CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
EP Application No. 15152834.6 Extended European Search Report dated Oct. 8, 2015, 7 pages.
European Application No. 12196665.9 Extended European Search Report dated Mar. 6, 2013, 7 pages.
European Search Report for European Application No. 13159950.8; dated Jun. 6, 2013; 7 pages.
European Search Report for related European Application No. 15152834.6, dated Oct. 8, 2015; 7 pages.
Gillespie, Thomas D.; "Fundamentals of Vehicle Dynamics"; Society of Automotive Enginers, Inc.; published 1992; 294 pages.
Kichun, et al.; "Development of Autonomous Car—Part II: A Case Study on the Implementation of an Autonomous Driving System Based on Distributed Architecture"; IEEE Transactions on Industrial Electronics, vol. 62, No. 8, Aug. 2015; 14 pages.
Office Action dated Aug. 29, 2016.
Partial European Search Report for related European Patent Application No. 14156901.8, dated Sep. 23, 2014, 6 pages.
Van Der Jagt, Pim; "Prediction of steering efforts during stationary or slow rolling parking maneuvers"; Jul. 2013, 20 pages.
Varunjikar, Tejas; Design of Horizontal Curves With DownGrades Using Low-Order Vehicle Dynamics Models; A Theisis by T. Varunkikar; 2011; 141 pages.
English Translation of Chinese Office Action and Search Report for Chinese Application No. 201611113746.9 dated May 4, 2018, 7 pages.
English Translation of Chinese Office Action for Chinese Application No. 201610427896.0 dated May 28, 2018, 10 pages.

\* cited by examiner

RETRACTABLE STEERING COLUMN WITH A RADIALLY PROJECTING ATTACHMENT

FIELD OF THE INVENTION

The following description relates to steering column assemblies and, more specifically, to a vehicle steering column assembly with attachment storage features.

BACKGROUND

When some vehicles are fitted with autonomous driving assist systems, it may become possible to retract the steering column and wheel away from the driver to provide space for non-driving related activities such as working, reading, game playing, etc. However, steering column attachments may interfere with vehicle components during forward storage of the steering column.

Accordingly, it is desirable to provide a vehicle with features to accommodate steering column attachments during forward storage.

SUMMARY OF THE INVENTION

In one exemplary embodiment of the present invention, a driver interface for a vehicle includes a steering column assembly and a structural facial. The steering column assembly includes a column constructed and arranged to move between a retracted state and an extended state, and an attachment projecting outward from the column. The structural facial defines an alcove for receipt of the attachment when the steering column is in the retracted state.

In another exemplary embodiment of the present invention, an instrument panel for a driver interface of a vehicle is adapted to be used with a steering column assembly. The steering column assembly has a steering column constructed and arranged to move axially along a centerline and between an extended state and a retracted state toward the instrument panel. An attachment of the steering column assembly projects radially outward from the steering column. The instrument panel includes a bottom wall and a perimeter wall that defines an alcove for receipt of the attachment when the steering column is in the retracted state.

In another exemplary embodiment of the present invention, a method of stowing a steering column assembly includes a step of moving the steering column assembly from an extended state to a retracted state. Through this movement, an attachment that projects outward from a column of the steering column assembly is inserted into an alcove defined by an instrument panel.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
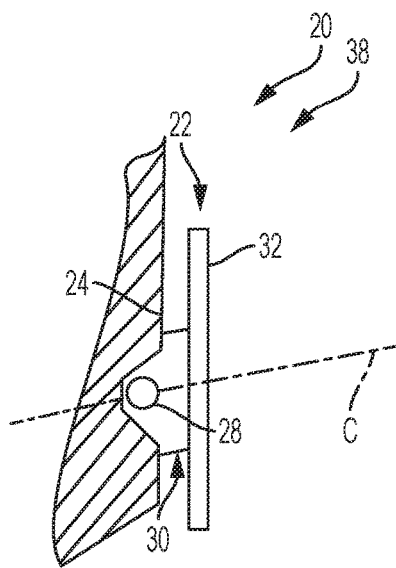
FIG. 1 is a cross section of a driver interface of a vehicle having a steering column assembly illustrated in a retracted state as one, non-limiting, exemplary embodiment of the present disclosure.

Referring now to the Figures, where the invention will be described with reference to specific embodiments, without limiting same, FIGS. 1-5 illustrate an exemplary, driver interface 20 of a vehicle including a retractable steering column assembly 22 and a structure facial 24 that may define a storage space or alcove 26 orientated to receive a steering column attachment 28.

Figure 2:
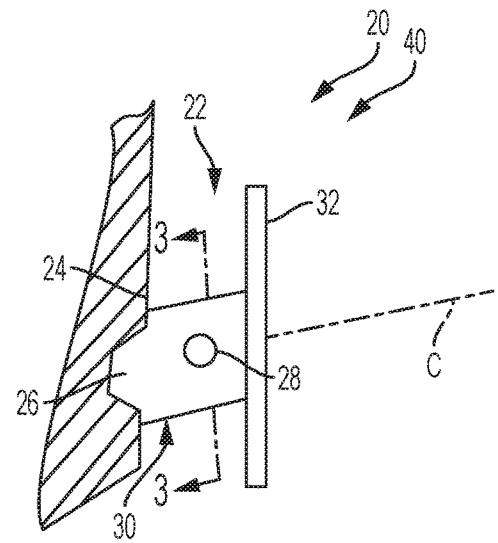
FIG. 2 is a cross section of the driver interface illustrating the steering column assembly in an extended state.
Figure 3:
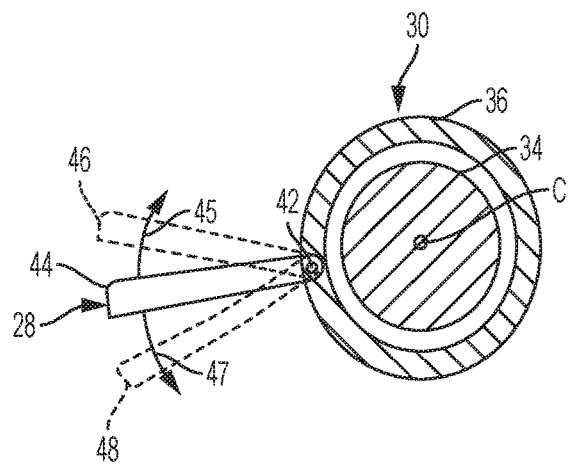
FIG. 3 is a cross section of the steering column assembly taken along line 3-3 in FIG. 2.
Figure 4:
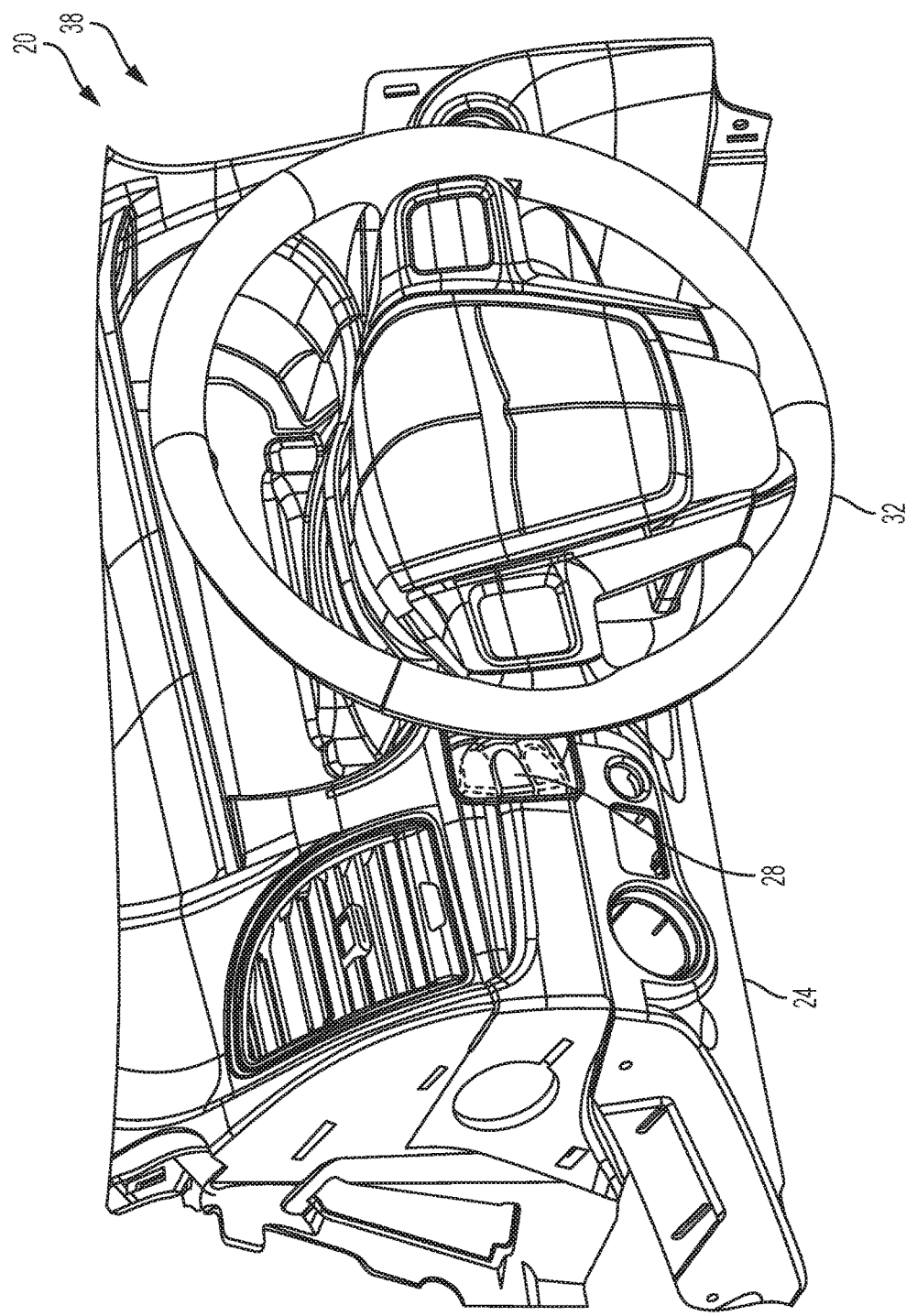
FIG. 4 is a perspective view of the driver interface with the steering column assembly in the retracted state.

Referring to FIGS. 1 through 3, the steering column assembly 22 of the driver interface 20 may include a steering column 30, a steering wheel 32, and the steering column attachment 28. The steering column 30 may include an inner member 34 configured for rotation about a centerline C, and an outer member 36 that may be a housing or shroud extending axially and circumferentially about the inner member 34. The steering wheel 32 is generally engaged to the end of inner member 34 and may be positioned for convenient rotation by a driver of the vehicle. The steering column attachment 28 may be engaged to and projects radially outward from the outer member 36 and may be positioned for convenient access by the driver.

Figure 5:
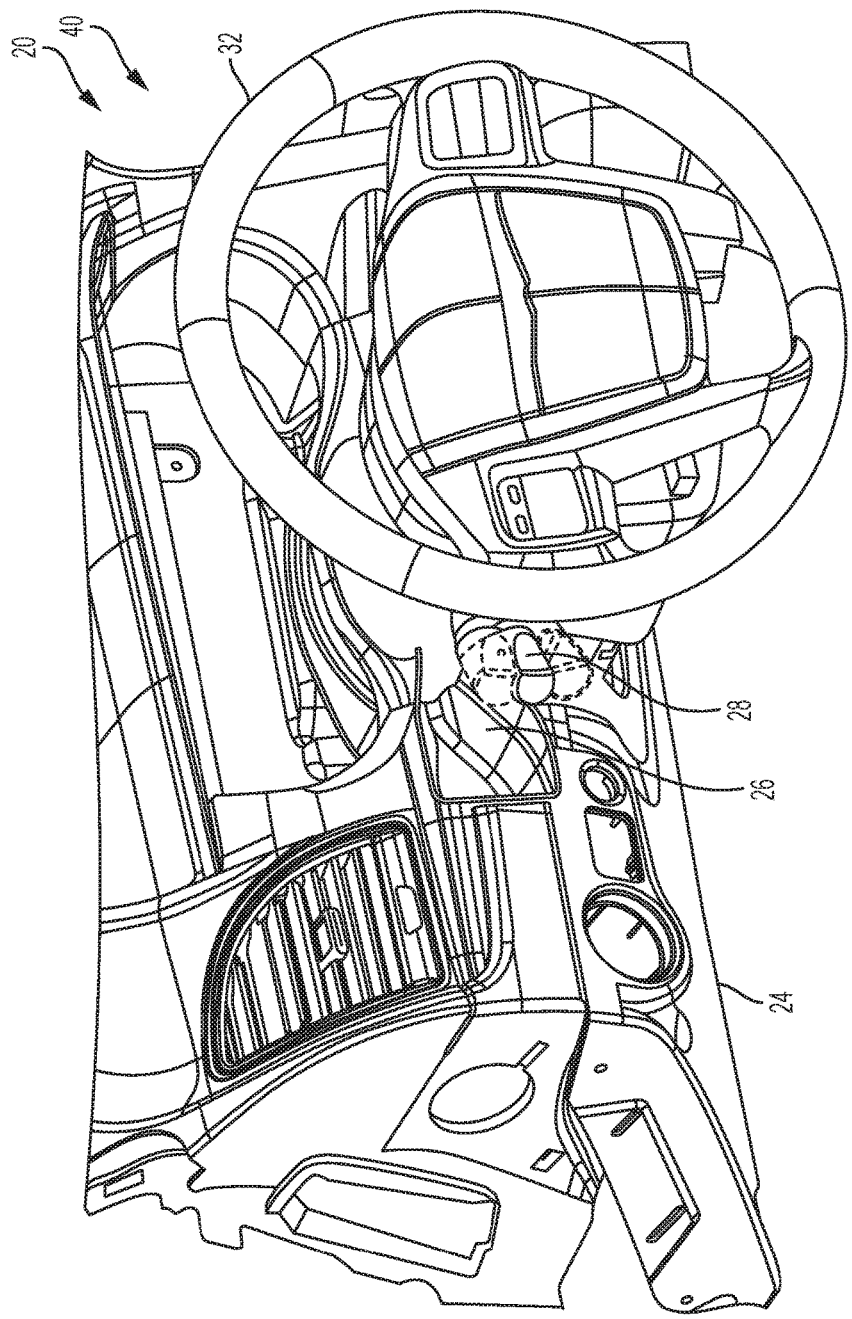
FIG. 5 is a perspective view of the driver interface with the steering column assembly in the extended state.

The steering column assembly 22 is constructed and arranged to move axially (e.g., telescopically) between a retracted state 38 (see FIGS. 1 and 4) and at least one extended state 40 (see FIGS. 2 and 5). When in the extended state 40, the steering wheel 32 may be used by a driver to steer the vehicle. When in the retracted state 38, portions of the steering column assembly 22, such as the steering wheel 32 are disposed away from the driver and toward the structure facial 24, which may provide additional space for the driver, when, for example, the driver is not driving the vehicle. It is contemplated and understood that the retracted state 38 may be a stowed state (i.e., the vehicle is generally not drivable), and the extended state 40 may be a deployed state (i.e., signifying drivability). When moving between the retracted and extended states 38, 40, the inner and outer members 30, 32 may both compress or shorten axially by any means known to one having ordinary skill in the art.

The structure facial 24 is disposed axially forward of the steering column attachment 28, and the steering column attachment is spaced axially forward of the steering wheel 32. The facial 24 defines boundaries of the alcove 26 positioned to receive the attachment 28 when the steering column assembly 22 is in the retracted state 38. The facial 24 may be an instrument panel, part of an instrument panel, or any other fixed panel or surface that substantially faces the driver.

Referring to FIG. 3, the steering column attachment 28 of the steering column assembly 22 may be engaged to and may project substantially radially outward from the outer member 36. As one example, the steering column attachment 28 may be (or may include) a turn signal lever arm or stalk, a headlight control stalk, or any other projecting structures that may be used to operate any variety of features of the vehicle. The attachment 28 may be moveably connected to the outer member 36 having a multitude of positions. As illustrated in one example, the attachment 28 may be pivotally connected to the outer member 36 at a pivot axis 42. In the present example, the turn signal lever arm 28 may generally pivot upward (i.e., circumferentially in a clockwise direction, see arrow 45) from a neutral position 44 and to an active position 46 to initiate, for example, a right hand turn signal. Similarly, the turn signal lever arm 28 may generally pivot downward (i.e., circumferentially in a counter-clockwise direction, see arrow 47) from the neutral position 44 and to a second active position 48 to initiate, for example, a left hand turn signal. It is further contemplated and understood that the present disclosure may provide storage compartments or alcoves 26 for attachments 28 of steering column assemblies 22 of a vehicle equipped with an Autonomous Driving Assist System (ADAS) or the like.

Figure 6:
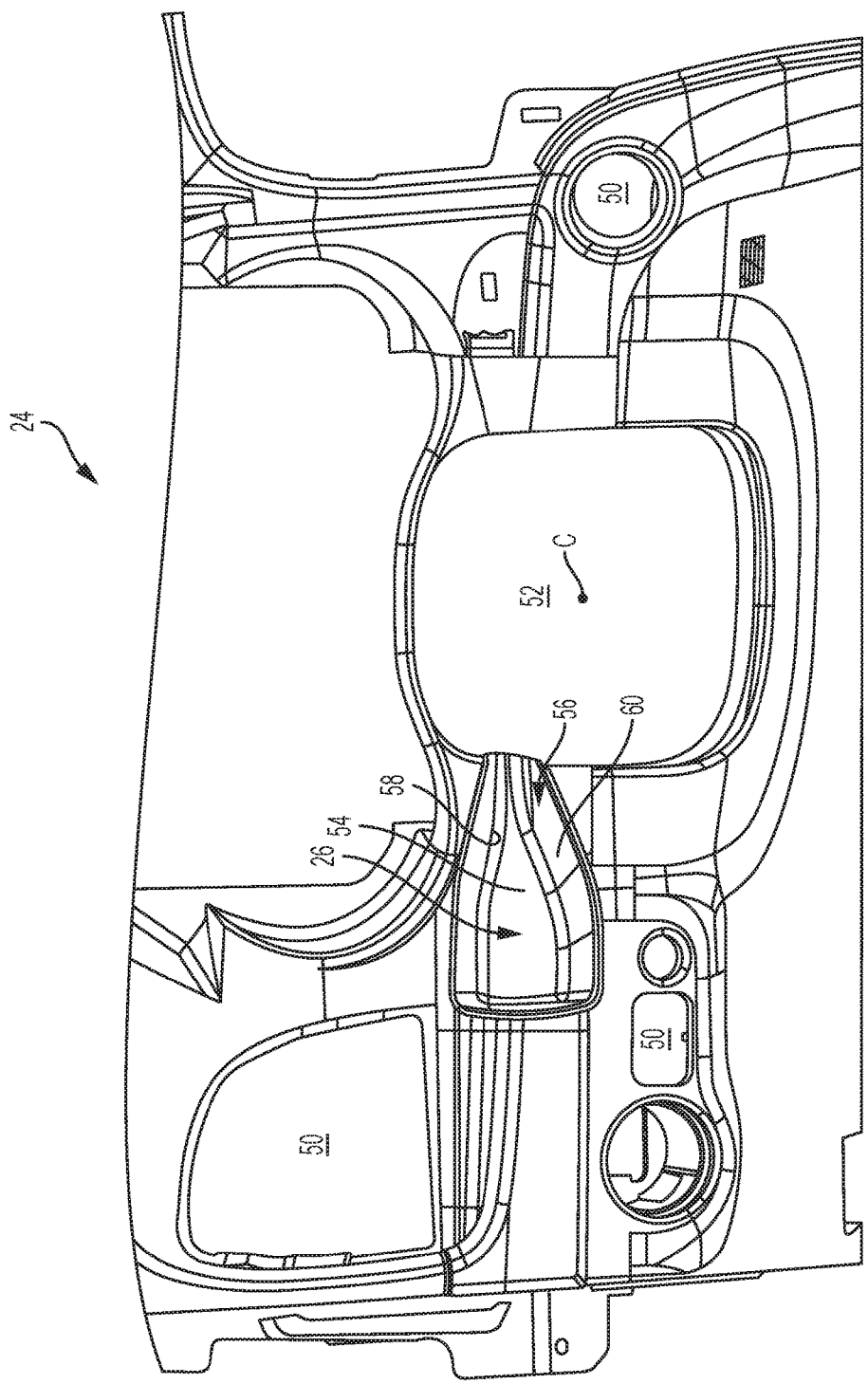
FIG. 6 is a partial perspective view of a structural facial of the driver interface.

Referring to FIG. 6, the facial 24 is illustrated as an instrument panel spaced forward of, and generally facing, the driver. The instrument panel 24 may include various features and/or apertures 50 for mounting various controls, indicators, vent devices, and others (not shown). The instrument panel 24 may also define a hole 52 through which the steering column 30 extends. The alcove 26 is generally open in an axial rearward direction with respect to centerline C and is open in a radial inward direction. Boundaries of the alcove 26 may be defined by a bottom wall 54 that may substantially face rearward toward the driver, and a perimeter wall 56 of the instrument panel 24 that at least in-part projects rearward from an outer perimeter of the bottom wall 54. Because the alcove 26 is open in a radially inward direction, the perimeter wall 56 may not extend continuously about the perimeter of the bottom wall 54.

The perimeter wall 56 may include a first ramped portion 58 and a generally opposing second ramped portion 60 (i.e., inclined). The first and second ramped portions 58, 60 are orientated such that an area of the bottom wall 54 may be smaller than the opening of the alcove (i.e. the rearward direction opening). The ramped feature of the portions 58, 60 may assist in urging the attachment 28 toward the neutral position 44 (see FIG. 3) when the steering column assembly 22 moves from the extended state 40 toward the retracted state 38.

Although not illustrated, the steering column assembly 22 may include any variety of tilt features, generally known in the art, that facilitate tilting (i.e., vertical positioning) of the steering wheel 32 for the convenience and comfort of the driver. With such a tilt feature, the steering column assembly 22 may include a tilt neutral position or a pre-set tilt position that may be needed before axial movement of the steering column 30 from the extended state 40 to the retracted state 38 can be accomplished. In this way, the attachment 28 may properly enter the alcove 26. That is, if the steering column 30 is tilted up or down, the steering column attachment 28 may not properly enter the alcove 26. Therefore, the steering column 30 may be aligned within a predetermined tolerance corresponding to a nominal position of the target (i.e., alcove). This constraint may be based on the probability that the vehicle interior design of the instrument panel 24 does not have sufficient area to provide an alcove large enough to accommodate every vertical or tilted adjustment position needed for driver comfort. As such, this requirement may require the use of a steering column vertical adjustment power actuator (not shown) that is given a command through a tilt or vertical position controller to go to a predetermined vertical position when a stow-away command is received.

Figure 7:
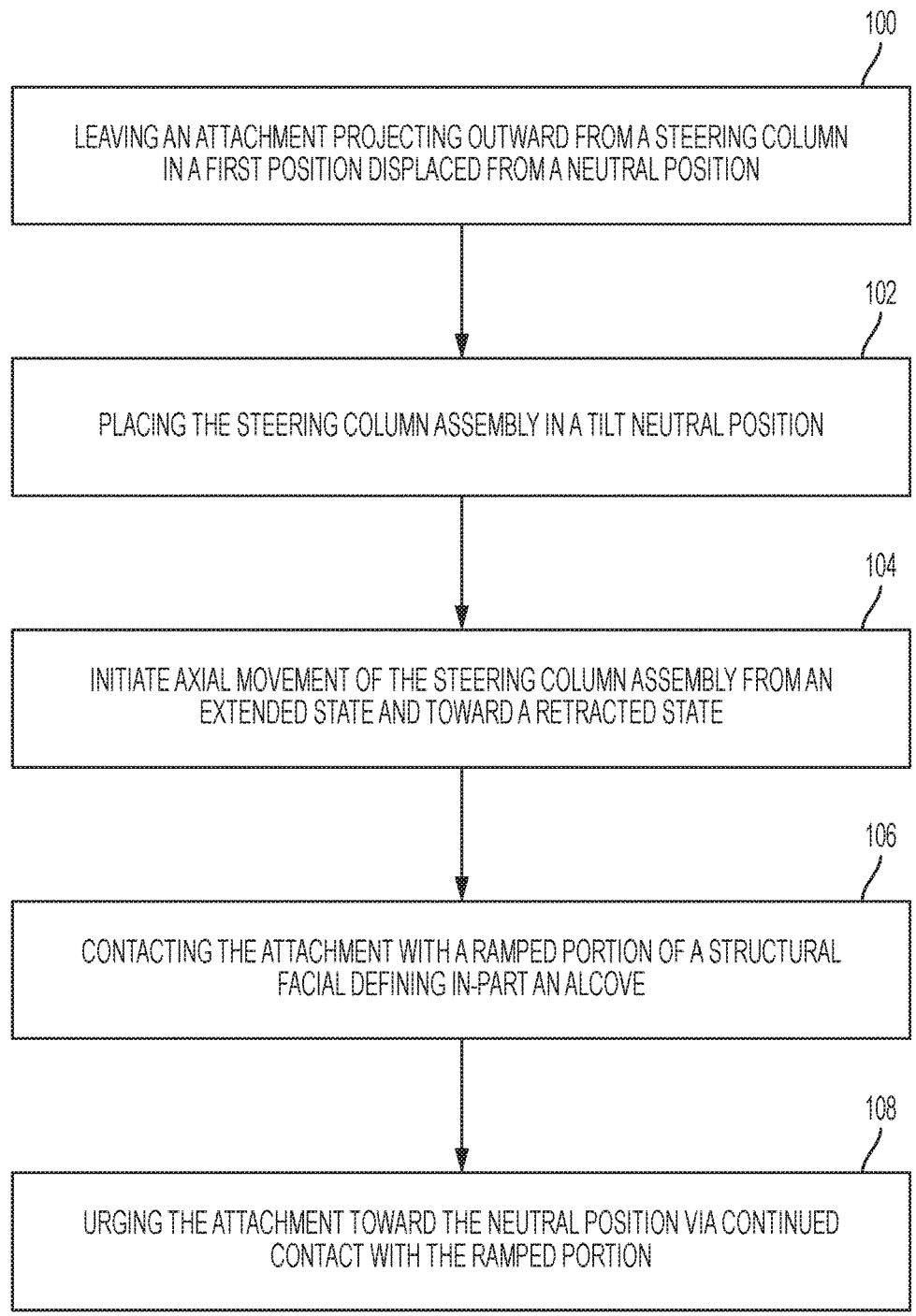
FIG. 7 is a flow chart of a method of operating the driver interface.

Referring to FIG. 7, one embodiment of a method of operating the steering column assembly 22 of the driver interface 20 may include block 100 where the turn signal lever arm 28 may be left (inadvertently or otherwise) in, for example, the active position 46 (see FIG. 3). In block 102, and if the steering column assembly 22 includes a tilt feature, generally known by one skilled in the art, the steering column assembly 22 may be placed in a tilt neutral position. In block 104 and with the turn signal lever arm 28 in the active position 46, the driver may initiate axial movement of the steering column assembly 22 from the extended state 40 and toward the retracted state 38. In block 106 and as the steering column assembly 22 axially retracts, the signal lever arm 28 may contact the ramped portion 58 as the arm is inserted into the alcove 26. In block 108, the continued contact of the signal lever arm 28 with the ramped portion 58 combined with the continued retraction of the steering column assembly 22 may urge the signal lever arm 28 into the neutral position 44.

Similar to the method described above, the turn signal lever arm 28 may be left in active position 48 and the driver may then initiate axial movement of the steering column assembly 22 from the extended state 40. The signal lever arm 28 may then contact the ramped portion 60 causing the arm to be moved into the neutral position 44 without any additional action by the driver.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A driver interface for a vehicle, the driver interface comprising:
   a steering column assembly including a column constructed and arranged to move between a retracted state and an outward extended state and an attachment projecting outward from the column; and
   a structural feature defining an alcove for receipt of the attachment when the steering column is in the retracted state, wherein the steering column moves axially along a centerline and the attachment projects radially outward from the steering column, and the attachment is a turn signal lever arm.

2. A driver interface for a vehicle, the driver interface comprising:
   a steering column assembly including a column constructed and arranged to move between a retracted state and an outward extended state and an attachment projecting outward from the column; and
   a structural feature defining an alcove for receipt of the attachment when the steering column is in the retracted state, wherein the steering column moves axially along a centerline and the attachment projects radially outward from the steering column, and the alcove is open in an axial outward direction and a radial inward direction for receipt of the attachment when the steering column moves from the extended state to the retracted state.

3. A driver interface for a vehicle, the driver interface comprising:
a steering column assembly including a column constructed and arranged to move between a retracted state and an outward extended state and an attachment projecting outward from the column; and
a structural feature defining an alcove for receipt of the attachment when the steering column is in the retracted state, wherein the steering column moves axially along a centerline and the attachment projects radially outward from the steering column, the attachment is constructed and arranged to move between at least a neutral position and a first position, and the structural feature is an instrument panel and includes a bottom wall and a perimeter wall that define the alcove, and wherein the perimeter wall is ramped for at least causing the attachment to move from the first position to the neutral position as the steering column moves from the extended state to the retracted state.

4. The driver interface set forth in claim 3, wherein the attachment is a turn signal lever arm constructed and arranged to pivot in a first circumferential direction as the turn signal lever arm is actuated from the neutral position to the first position, and pivot in an opposite second circumferential direction as the turn signal lever arm is actuated from the neutral position to a second position.

5. The driver interface set forth in claim 4, wherein the perimeter wall includes a first ramped portion and a second ramped portion that faces at least in-part the first ramped portion, and wherein the turn signal lever arm is constructed and arranged to contact the first ramped portion when turn signal lever arm is in the first position as the steering column moves from the extended state to the retract state, and contact the second ramped portion when the turn signal lever arm is in the second position as the steering column moves from the extended state to the retract state.

6. A driver interface for a vehicle, the driver interface comprising:
a steering column assembly including a column constructed and arranged to move between a retracted state and an outward extended state and an attachment projecting outward from the column; and
a structural feature defining an alcove for receipt of the attachment when the steering column is in the retracted state, wherein the steering column moves axially along a centerline and the attachment projects radially outward from the steering column, and the steering column assembly includes a steering wheel and the attachment is disposed axially between the structural feature and the steering wheel.

7. An instrument panel for a driver interface of a vehicle that includes a steering column assembly having a steering column constructed and arranged to move axially along a centerline and between an extended state and a retracted state toward the instrument panel, and an attachment projecting radially outward from the steering column, the instrument panel comprising:
a bottom wall and a perimeter wall that define an alcove for receipt of the attachment when the steering column is in the retracted state.

8. The instrument panel set forth in claim 7, wherein the alcove is open in an axial outward direction and a radial inward direction for receipt of the attachment when the steering column moves from the extended state to the retracted state.

9. The instrument panel set forth in claim 8, wherein the perimeter wall is ramped.

10. The instrument panel set forth in claim 9, wherein the perimeter wall includes a first ramped portion and a second ramped portion that faces at least in-part the first ramped portion, and wherein the attachment is constructed and arranged to contact the first ramped portion when in a first position as the steering column moves from the extended state to the retract state, and contact the second ramped portion when the attachment is in a second position as the steering column moves from the extended state to the retract state.

11. The instrument panel set forth in claim 8, wherein the perimeter wall is contoured to reflect a range of circumferential positions of the attachment.

12. A method of stowing a steering column assembly comprising:
moving a steering column assembly from an extended state to a retracted state; and
inserting an attachment projecting outward from a column of the steering column assembly into an alcove defined by an instrument panel.

13. The method set forth in claim 12 further comprising:
placing the steering column into a tilt neutral position before inserting the attachment.

14. The method set forth in claim 12 further comprising:
contacting the attachment with a ramped perimeter wall defining the alcove if the attachment is not in a neutral position.

15. The method set forth in claim 14, wherein the contact of the attachment with the ramped perimeter wall causes the attachment to move into the neutral position.

* * * * *